US012344079B2

(12) United States Patent
Plourde, Jr. et al.

(10) Patent No.: US 12,344,079 B2
(45) Date of Patent: Jul. 1, 2025

(54) AUTOMOTIVE SIDE DOOR STRUCTURE

(71) Applicants: MAGNA INTERNATIONAL INC., Aurora (CA); Lawrence M. Plourde, Jr., Macomb, MI (US); Mari Anna Chellman, Berkley, MI (US); David Cummings, Clinton Township, MI (US); Armando Perez, Rochester Hills, MI (US); Vijaykumar Gabbita, Farmington Hills, MI (US)

(72) Inventors: Lawrence M. Plourde, Jr., Macomb, MI (US); Mari Anna Chellman, Berkley, MI (US); David Cummings, Clinton Township, MI (US); Armando Perez, Rochester Hills, MI (US); Vijaykumar Gabbita, Farmington Hills, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 412 days.

(21) Appl. No.: 18/012,676

(22) PCT Filed: Jul. 6, 2021

(86) PCT No.: PCT/US2021/040417
§ 371 (c)(1),
(2) Date: Dec. 23, 2022

(87) PCT Pub. No.: WO2022/010826
PCT Pub. Date: Jan. 13, 2022

(65) Prior Publication Data
US 2023/0264544 A1 Aug. 24, 2023

Related U.S. Application Data

(60) Provisional application No. 63/048,332, filed on Jul. 6, 2020.

(51) Int. Cl.
*B60J 5/04* (2006.01)

(52) U.S. Cl.
CPC .......... *B60J 5/0426* (2013.01); *B60J 5/0402* (2013.01); *B60J 5/0434* (2013.01); *B60J 5/0437* (2013.01); *B60J 5/0443* (2013.01); *B60Y 2306/09* (2013.01)

(58) Field of Classification Search
CPC ...... B60J 5/0426; B60J 5/0437; B60J 5/0408; B60J 5/0402; B60J 5/0434; B60J 5/0425; B60J 5/0448
(Continued)

(56) References Cited

U.S. PATENT DOCUMENTS 5,466,032 A * 11/1995 Clausen ................ B60J 5/0444
296/187.12
5,904,002 A 5/1999 Emerling et al.
(Continued)

FOREIGN PATENT DOCUMENTS

EP 3448701 B1 5/2020

*Primary Examiner* — Jason S Morrow
(74) *Attorney, Agent, or Firm* — Dickinson Wright PLLC

(57) ABSTRACT

A door structure system for a vehicle includes an inner panel, an outer panel, and an outer belt reinforcement member. The outer belt reinforcement member extends in a fore-and-aft direction of the door structure. The outer belt reinforcement member creates an overlap joint with a hem flange portion of the inner panel. The outer belt reinforcement member includes touch-down feature that extends toward the inner panel and into contact with a bearing surface of the inner panel that is stepped down relative to the hem flange portion. The overlap joint and the touch-down feature both contribute to an increased upper frame stiffness of the door structure and improve sealing performance between the door structure and the vehicle body structure.

20 Claims, 3 Drawing Sheets

(58) Field of Classification Search
USPC .................................................. 296/146.6
See application file for complete search history.

(56) References Cited

U.S. PATENT DOCUMENTS

| | | | |
|---|---|---|---|
| 6,302,473 | B1 | 10/2001 | Weber |
| 9,346,339 | B2* | 5/2016 | Shimizu ................... B60J 5/042 |
| 9,610,829 | B1 | 4/2017 | Stachewicz et al. |
| 9,834,070 | B2* | 12/2017 | Garimella ................ B60J 5/048 |
| 10,589,604 | B2* | 3/2020 | Schlachter ............. B60J 5/0468 |
| 11,807,083 | B2* | 11/2023 | Thor ...................... B60J 5/0429 |
| 11,872,873 | B2* | 1/2024 | Snyder ................... B60J 5/0413 |
| 11,878,576 | B2* | 1/2024 | Nakayama ............. B60J 5/0448 |
| 12,263,725 | B2* | 4/2025 | Nakayama ............. B60J 5/0437 |
| 2006/0152035 | A1* | 7/2006 | Baker .................... B60J 5/0444 |
| | | | 296/146.6 |
| 2007/0222256 | A1 | 9/2007 | Valentage et al. |
| 2008/0007087 | A1 | 1/2008 | Endo |
| 2015/0367715 | A1* | 12/2015 | Inamoto ................ B60J 5/0443 |
| | | | 296/146.6 |
| 2017/0282695 | A1 | 10/2017 | Resch et al. |
| 2019/0084387 | A1* | 3/2019 | Smith .................... B60J 5/0481 |
| 2024/0100920 | A1* | 3/2024 | Choi ...................... B60J 5/0431 |

* cited by examiner

AUTOMOTIVE SIDE DOOR STRUCTURE

CROSS-REFERENCE TO RELATED APPLICATIONS

This U.S. National Stage Patent Application claims the benefit of PCT International Patent Application Serial No. PCT/US2021/040417 filed Jul. 6, 2021 entitled "AUTOMOTIVE SIDE DOOR STRUCTURE" which claims the benefit of U.S. Provisional Patent Application Ser. No. 63/048,332 filed on Jul. 6, 2020, and titled "Automotive Side Door Structure", the entire disclosures of which are hereby incorporated by reference.

TECHNICAL FIELD

The present disclosure relates to automotive vehicle structures. More particularly, the present disclosure relates to a side door vehicle structure.

BACKGROUND OF THE DISCLOSURE

Automotive vehicles (including but not limited to electric vehicles, hybrid vehicles, and other passenger vehicles), include various components assembled together to define the overall shape and function of the vehicle. For example, a vehicle sub-frame provides support for the engine and the vehicle body extending upwardly from the sub-frame.

The vehicle body may include front, side, rear, floor, and roof portions disposed above the subframe. Typically, the vehicle body may include a frame portion, including various sections and pillars that define the shape of the vehicle and provide stiffness to the vehicle, allowing further structure to be assembled thereto and further providing protection to vehicle occupants, both from outside elements as well as collisions, in accordance with various standards.

The vehicle body defines the interior of the vehicle in which passengers may operate the vehicle and ride within the vehicle. The vehicle doors, such as the side doors, provide access to the vehicle via openings defined by the vehicle structure, and in particular between the A, B, and C-pillars of the upper vehicle body.

Upper frame stiffness is an issue in many vehicles that vehicle side doors may be used to solve. The stiffness provided by the side doors is a target value for each vehicle. When stiffness is higher, the vehicle door may provide better seal performance against the upper frame of the vehicle, thereby reducing wind noise and reducing water leaks.

In some instances, less than optimal frame size may occur during manufacturing. Accordingly, when side doors are assembled with the vehicle structure, seals may be difficult to achieve. One aspect in such instances is to use a flexible gasket type material disposed between the door structure and the frame structure. However, such material accordingly has low stiffness so that it can fill the variable space between side door and frame. This reduced stiffness can cause increased wind noise and water leaks.

In view of the above, improvements can be made to increase stiffness of vehicle side door structures for mating with vehicle structure.

SUMMARY OF THE INVENTION

In one aspect, a door-panel structure system includes: an inner panel having a front portion, rear portion, upper portion, and lower portion; an outer panel sized and arranged to mate with the inner panel to define a door structure having a first stiffness and an interior cavity; an outer belt reinforcement member extending between the front portion and the rear portion of the inner panel, and vertically disposed between the upper portion and the lower portion, and laterally disposed between the outer panel and the inner panel; wherein the outer belt reinforcement member defines an overlap joint with a hem flange portion of the inner panel, wherein the hem flange portion is disposed on the rear portion of the inner panel; a touch-down member extending inwardly from the outer belt reinforcement member into contact with a bearing surface of the inner panel; and wherein the overlap joint and the contact with the bearing surface combine to define a second stiffness that is greater than the first stiffness.

In one aspect, the hem flange portion of the inner panel is disposed at a rear edge of the inner panel, wherein the outer panel overlaps the overlap joint and wraps around the rear edge of the inner panel to define a hem flange.

In one aspect, the touch-down member is integrally formed with the outer belt reinforcement member.

In one aspect, the inner panel defines a step portion recessed relative to the hem flange portion, wherein the touch-down portion contacts a bearing surface of the step portion.

In one aspect, the hem flange portion of the inner panel is stepped down relative to an adjacent section of the rear portion of the inner panel such that the outer belt reinforcement member and the adjacent section are generally continuous and define a common plane against which the outer panel is mounted.

In one aspect, the system includes at least one reinforcement member attached to the inner panel.

In one aspect, the at least one reinforcement member includes a window frame reinforcement member.

In one aspect, a lower portion of the window frame reinforcement member is disposed laterally between the inner panel and the outer belt reinforcement member.

In one aspect, the lower portion of the window frame reinforcement member has a profile corresponding to an inner surface of the inner panel, and wherein the outer belt reinforcement member is spaced away from the window frame reinforcement member.

In one aspect, the touch-down member and the window frame reinforcement member each directly contact the inner surface of the inner panel.

In one aspect, the outer belt reinforcement member defines a through-opening at a rear portion thereof, wherein the touch-down member is disposed adjacent the through-opening.

In one aspect, the system includes an impact beam extending in a fore-and-aft direction within the interior cavity and fixed to the door structure, wherein the impact beam provides additional stiffness to the door structure.

In another aspect, a method of increasing a stiffness of a door-panel structure system is provided, the method including: providing an inner panel with a front portion, rear portion, upper portion, and lower portion; attaching an outer belt reinforcement member to the inner panel, wherein the outer belt reinforcement member extends in a fore-and-aft direction of the door panel structure; creating an overlap joint between a rear end of the outer belt reinforcement member and a hem flange portion of the inner panel; bringing a touch-down member of the outer belt reinforcement member into contact with a bearing surface of the inner panel, wherein the bearing surface is stepped down relative to the overlap joint; and attaching an outer panel to the inner panel, wherein the outer panel covers the outer belt reinforcement member and defines an interior cavity with the inner panel.

In one aspect, the method includes wrapping a rear edge of the outer panel around the overlap joint and defining a hem flange around the rear end of the outer belt reinforcement member and the hem flange portion of the inner panel.

In one aspect, the method includes attaching a window frame reinforcement member to the inner panel and attaching the outer belt reinforcement member to the inner panel over a lower portion of the window frame reinforcement member, wherein the outer belt reinforcement member is spaced away from lower portion of the window frame reinforcement member to define an open space laterally therebetween.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
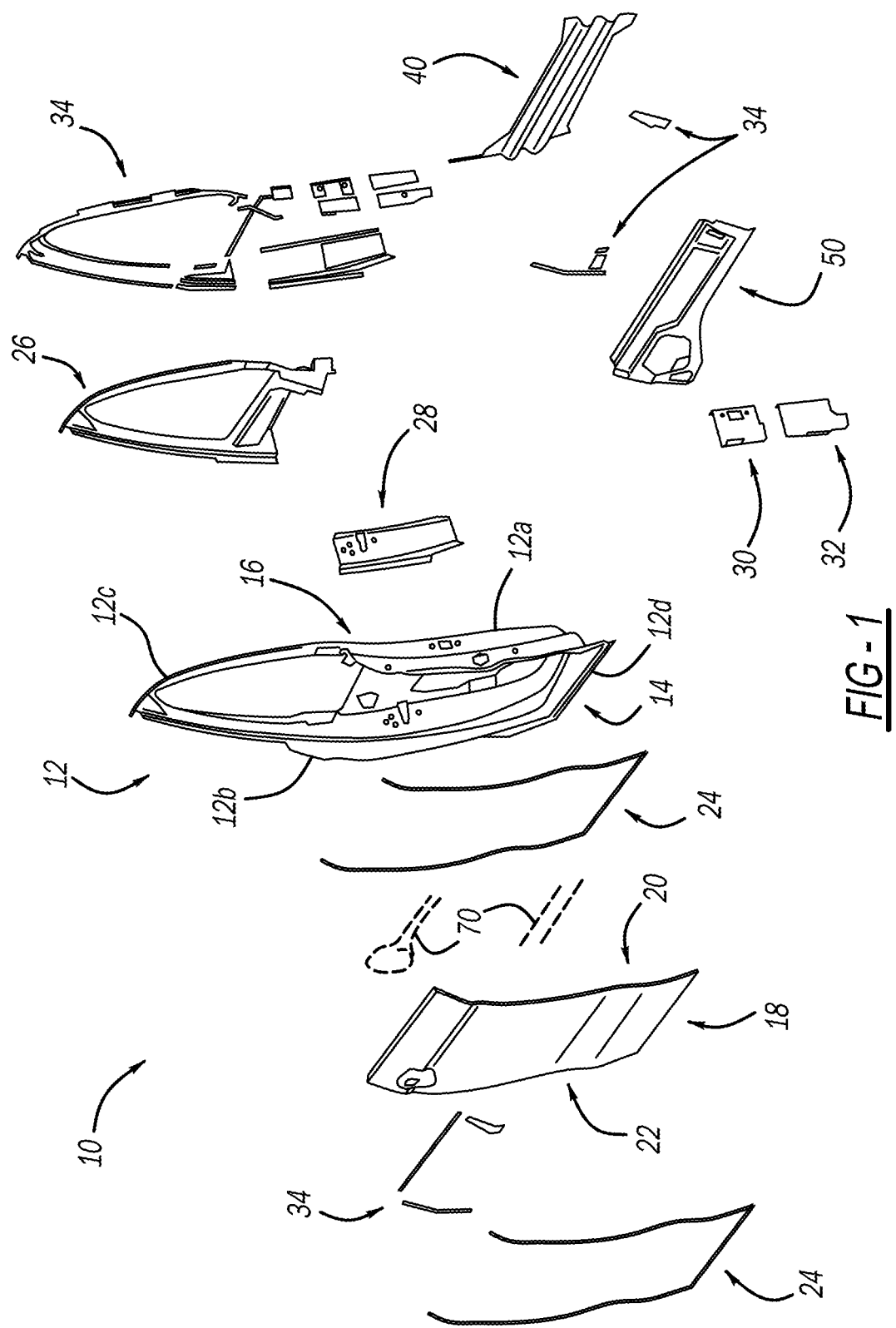
FIG. 1 is an exploded view of a door structure system for a vehicle, including an inner panel, outer panel, window frame reinforcement, latch reinforcement, check link reinforcement, lower hinge reinforcement, impact beam, and outer belt reinforcement member.
Figure 2:
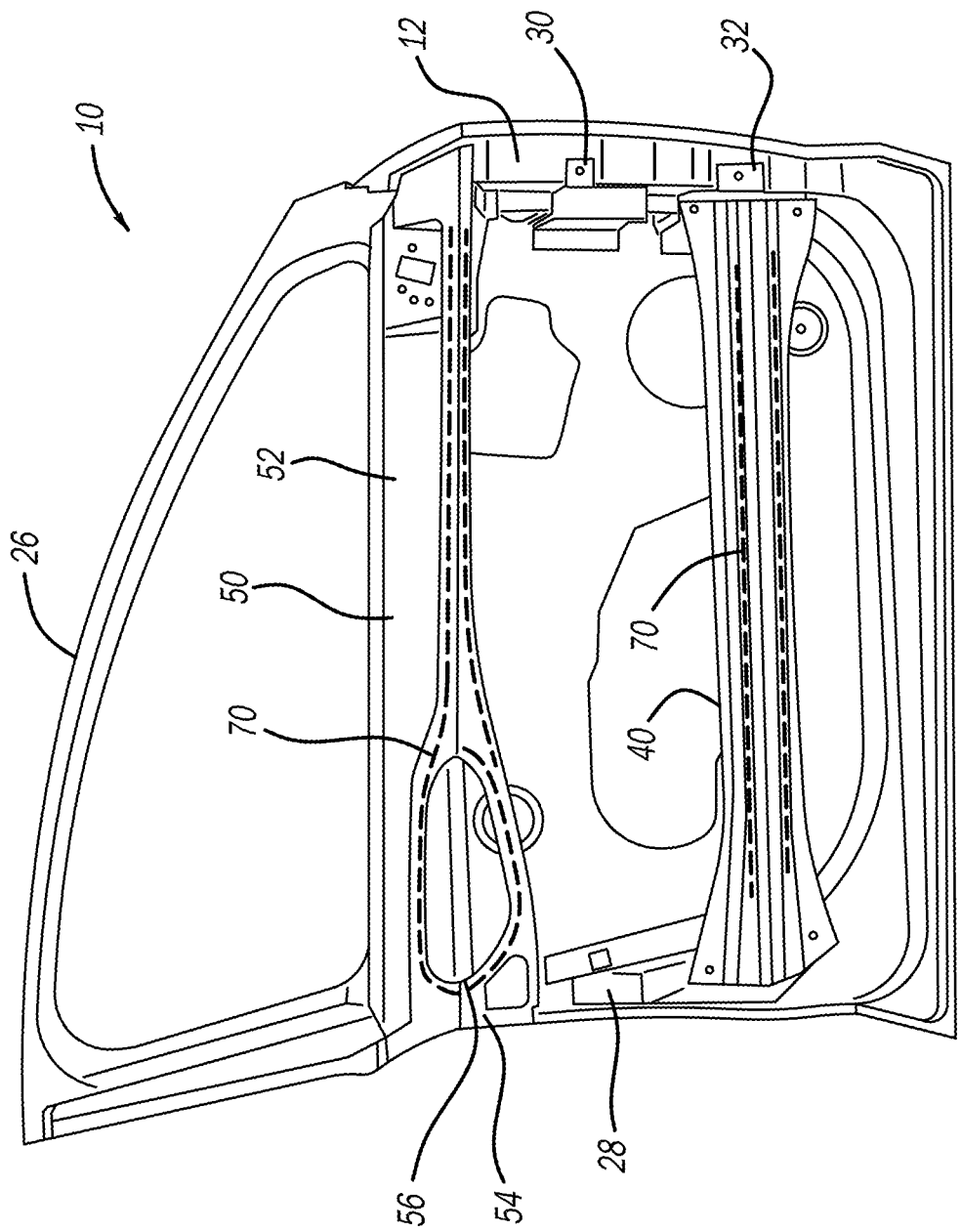
FIG. 2 is an assembled view of the door structure system, illustrated with the outer panel removed for clarity.

Referring to FIGS. 1, a vehicle structural system 10 is illustrated in an exploded view. The system 10 is generally illustrated in a "body-in-white" condition or, more particularly in FIG. 1, a "door-in-white" condition, which is the condition where structural components have been joined together, but prior to painting and assembly of various components (such as window regulator mechanisms or latch mechanisms) that are carried on the structural components. Of course, with FIG. 1 being an exploded view, the various structural components of the system 10 are not shown "assembled." The assembled system 10 corresponding to FIG. 1 is generally shown in FIG. 2, with some components not shown for clarity, as further described below.

With continued reference to FIG. 1, the system 10 is illustrated as a front side door, such as the door installed on the front half of a four-door sedan-type vehicle. It will be appreciated that aspects of the system 10 disclosed herein may be applied to rear side doors or other door types, including doors with side hinges, doors with upper hinges, sliding doors, etc. FIG. 1, more particularly, illustrates a right-side or passenger-side (United States convention) door. For purposes of discussion, the illustrated side door will be discussed herein, but it will be appreciated that the aspects of this disclosure are not necessarily limited to such doors.

The system 10 includes an inner panel 12, to which various door components and other structural components making up the overall door structure of the system 10 may be attached. The inner panel includes a front portion 12a, a rear portion 12b, an upper portion 12c, and a lower portion 12d. The front portion 12a is typically the portion adjacent the door hinge, and the rear portion 12b is typically the portion having the door latch that engages a striker on the vehicle body. The inner panel 12 is configured to define, in part, an interior cavity of the door that may accommodate various internal door components, such as a window regulator, latch mechanisms, the window glass when in a down-position, and the like. Various types of component installation methods and mechanisms may be used with the inner panel 12, and the inner panel 12 may have different shapes and sizes corresponding to such installation methods and mechanisms, so long as such modifications do not interfere with the aspects of the present disclosure.

The upper portion 12c may be in the form of a curved bar or the like that extends upward and rearward from the front portion 12a and toward the rear portion 12b. The shape of the upper portion 12c may correspond generally to the shape of the A-pillar of the vehicle body structure and the roof line of the vehicle. Accordingly, differing vehicle body shapes will have a corresponding different shape or curve of the upper portion 12c.

The rear portion 12b extends downward from the rear end of the upper portion 12c in a generally vertical manner, defining a rear edge of the inner panel 12. The rear portion 12b is generally sized and arranged to correspond to the position of the B-pillar of the vehicle body structure. The rear portion 12b may include a provision for latch structure, such as latch system with a ratchet configured to capture a striker mounted to the vehicle body structure. For example, rear portion 12b may define an opening that can receive a striker such that the striker can engage the latch mechanism of the door. Of course, latch mechanisms may be installed at other locations and may have other arrangements.

The lower portion 12d extends from the lower end of the rear portion 12b toward the lower end of the front portion 12a, and generally defines the bottom edge of the door and corresponds generally to the bottom edge of the vehicle.

The front portion 12a extends upwardly from the front end of the lower portion 12d and toward the front/lower end of the upper portion 12c. The front portion 12a may be the portion to which hinge structure may be attached, and may be the portion of the door that pivots relative to the vehicle body and supports the door when the door is in an open position.

The inner door panel 12 includes an inner surface 14 and an outer surface 16. The inner surface 14 generally faces the interior of the door defined in part by the inner door panel 12. The outer surface 16 generally faces an interior of the vehicle, and is the surface that faces the passengers. Thus, the inner surface 14 of the inner door panel 12 generally faces outward relative to the passenger compartment.

The system 10 further includes an outer panel 18, which may also be referred to as a door outer, with the inner panel 12 also being referred to as a door inner. The outer panel 18 may be sized and arranged to mate with the inner panel 12 and to define, along with the inner panel 12, the interior space of the door.

The outer panel 18 accordingly includes an inner surface 20 that faces the inner surface of the inner panel 12 and an outer surface 22 that faces outwardly and away from the vehicle. The outer panel 18 may have a curvature corresponding to the outer body style of the vehicle and also to mate with the corresponding outwardly facing edges and surfaces of the inner panel 12 to which the outer panel 18 mates.

As shown in FIG. 1, the inner panel 12 may have a stamped shape, defining a plurality of sidewall portions around its perimeter. These sidewall portions generally define the shape of the interior cavity or space of the door. The outer panel 18, as illustrated in FIG. 1, has a generally sheet-like shape, which may act like a cover that substantially encloses the interior cavity or space that is defined by the sidewalls of the inner panel 12.

The outer panel 18 may be attached to the inner panel 12 via a hem flange, in which the edges of the outer panel 18 bend over and around the edges of the inner panel 12. Accordingly, the system 10 may include a plurality of hem flange adhesives 24 that have a counter corresponding to the shape of the hem flange connection between the outer panel 18 and the inner panel 12.

The outer panel 18 typically covers the bottom half of the inner panel 12, defining the interior space within the door along with the inner panel 12. The system 10 may further include a window frame reinforcement 26 that is disposed above the outer panel 18. The window frame reinforcement 26 has a curved profile that corresponds to the upper portion 12c of the inner panel 12. The window frame reinforcement 26 may be in the form of a panel that overlies an upper inner surface of the inner panel 12. Thus, the window frame reinforcement 26 has an inner surface disposed against the inner panel 12 and an outer surface facing outwardly from the vehicle. FIG. 1 illustrates the window frame reinforcement 26 disposed on the inner side of the inner panel 12 in the exploded view, but when assembled the reinforcement 26 overlies the surface of the inner panel that faces outwardly from the vehicle (the same side that the outer panel 18 is disposed on the inner panel 12). FIG. 2 illustrates reinforcement 26 on this side of the inner panel 12.

The system 10 further includes a latch reinforcement panel 28 disposed on an inner surface of the inner panel 12. Put another way, latch reinforcement panel 28 may be disposed within the interior cavity defined by the inner panel 12 (similar to window frame reinforcement 26, latch reinforcement panel 28 is shown in the exploded view of FIG. 1 on the right side of the inner panel 12). More particularly, the latch reinforcement panel 28 may be disposed at an area corresponding to the location of a latch mechanism, at the rear portion 12b of the inner panel 12. The latch reinforcement may provide additional stiffness to the door at its location for supporting the latch mechanism. Latch mechanism typically undergo increased loads, such as opening loads while the door remains latched, or impact loads when the door is closed from the open position, such that the latch reinforcement panel 28 may be provide additional strength to the door in this location of increased loads.

Additionally, the system 10 may further include a check link reinforcement 30 and a lower hinge reinforcement 32, each in the form of panels applied to an inner surface of the inner panel 12 along the front portion 12a. These reinforcements 30 and 32 are shown within the interior space defined by the inner panel 12 in FIG. 2, similar to the reinforcements described above. The door hinge and check link, similar to the latch mechanism, undergo increased loading and therefore these reinforcements 30, 32 provide additional strength in the area of the increased loading.

The above described reinforcement panels 26, 28, 30, and 32 may be joined with the inner panel 12 via a structural adhesive 34, which is disposed along the overlapping areas between the inner panel 12 and the reinforcement panels.

The system 10 may further include an impact beam 40 that extends in a fore-and-aft direction of the vehicle, and extends between the front portion 12a and the rear portion 12b of the inner panel 12. The impact beam 40 provides structural reinforcement to door in an impact area of the door. Impact beam 40, shown attached to the inner panel in FIG. 2, is disposed on the lower half of the inner panel 12, and is typically aligned with the expected impact area in the event of a collision. The impact beam 40 may be disposed on top of the latch reinforcement panel 28 and lower hinge reinforcement 28 (in a direction of stack-up), as shown in FIG. 2.

The system 10 further includes an outer belt reinforcement member 50. The outer belt reinforcement member 50 is attached to the inner door panel 12 generally at the interface between the window frame reinforcement 26 and the outer panel 18. The outer belt reinforcement 50 extends in the fore-and-aft direction between the front portion 12a and the rear portion 12b of the door panel 12, similar to the impact beam 40. The outer belt reinforcement member 50 is disposed higher on the door relative to the impact beam 40. The outer belt reinforcement member 50 is disposed on top of the window frame reinforcement in a stack-up direction, as shown in FIGS. 2-4.

With reference to FIG. 2, the outer belt reinforcement member 50 includes an upper portion 52 and a lower portion 54. The upper portion 52 is disposed adjacent the window opening, and the lower portion 54 is disposed inside the door cavity defined by the inner panel 12 and the outer panel 18.

The upper portion 52 may be slightly bent relative to the lower portion 54, such that the upper portion may follow the contour of the inner panel 12 extending toward the window opening. The upper portion 52 and the lower portion 54 may combine to define a pass-through opening 56, which is disposed adjacent a rear end of the outer belt reinforcement 50. The opening 56 extends into both the upper portion 52 and lower portion 54. A crease or bend defined between the upper portion 52 and lower portion 54 may intersect the opening 56, as shown in FIG. 2.

Figure 3:
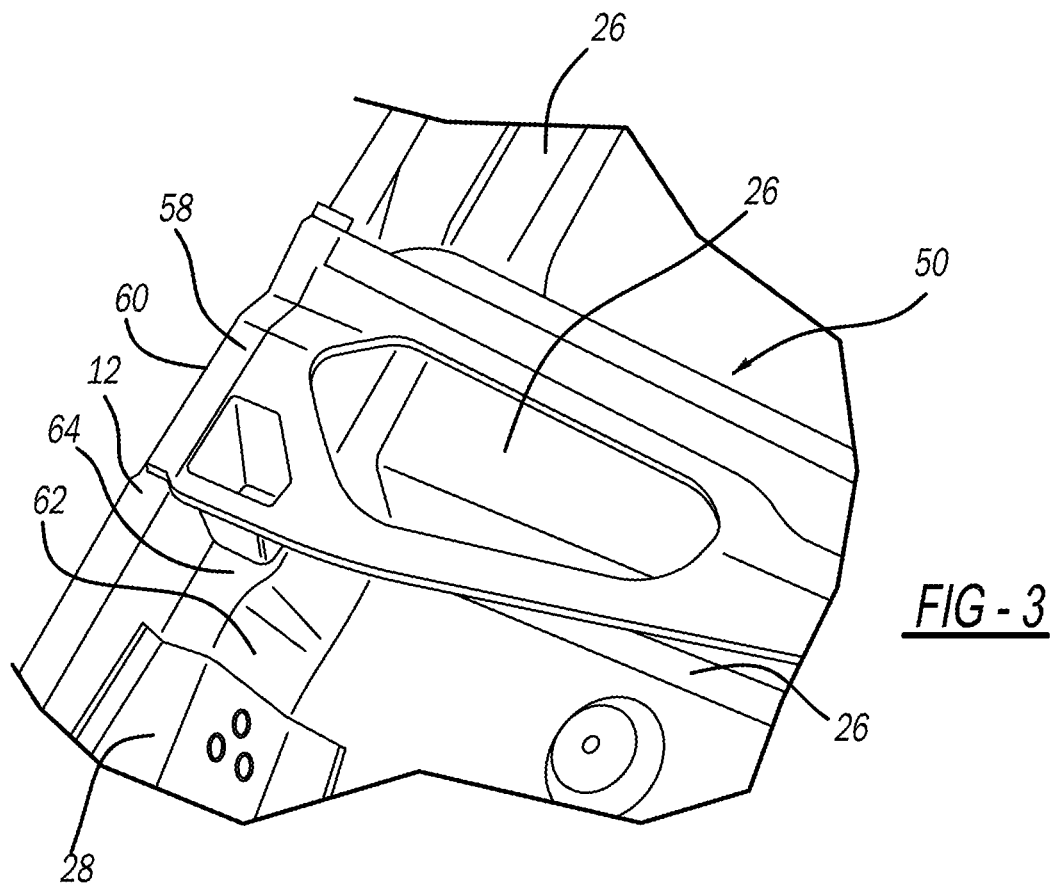
FIG. 3 is an enlarged view of the outer belt reinforcement member illustrating an overlap joint with a hem flange portion of the inner panel.
Figure 4:
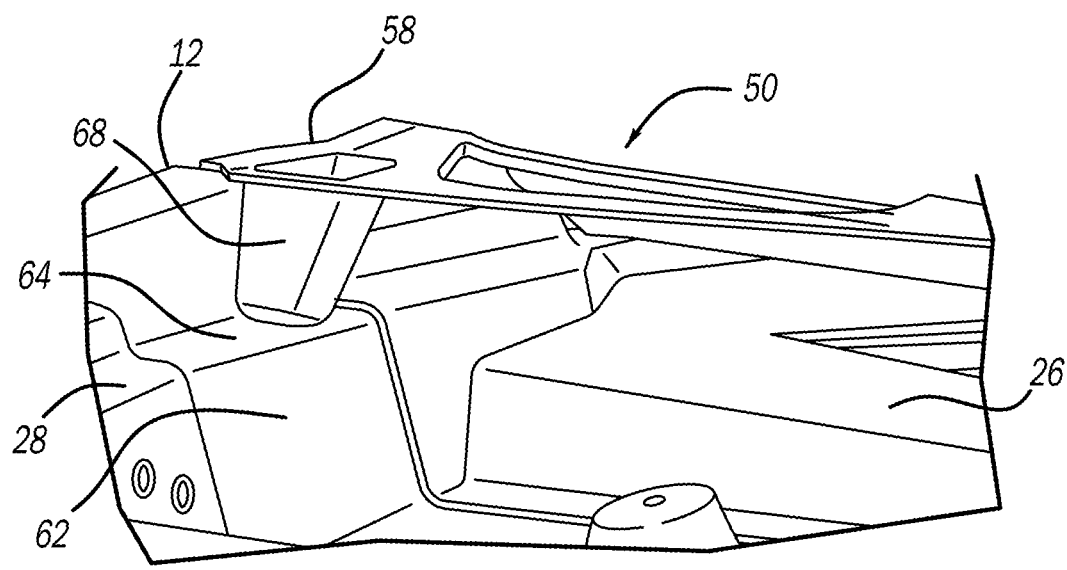
FIG. 4 is an enlarged view of the outer belt reinforcement illustrating a touch-down feature of the outer belt reinforcement member extending into engagement with a surface of the inner panel.

As shown in FIG. 3, the outer belt reinforcement 50 includes a rear flange 58 extending in a generally vertical direction along the rear edge of the door. The rear flange 58 is arranged to overlap a hem flange portion 60 of the inner panel 12. The hem flange portion 60 of the inner panel 12 also extends along the rear edge of the inner panel 12. FIG. 4 further illustrates the rear flange 58 overlaying the hem flange portion 60 of the inner panel.

When the outer panel 18 is joined with the inner panel 12 to create a hem flange at the rear edge of the door, the outer panel 18 may wrap around the outer belt reinforcement 50 at the rear flange 58 and the hem flange portion 60 of the inner panel 12. Accordingly, the rear flange 58 may be sandwiched between the hem flange portion 60 of the inner panel 12 and the outer panel 18. Similarly, the hem flange portion 60 may be sandwiched between the rear edge 58 of the outer belt reinforcement 50 and the rear portion of the outer panel 18 that has wrapped around the rear edge 58 and the hem flange portion 60.

The inner panel 12 may further include a step portion 62 that is stepped down from the rear flange portion 60. The step portion 62 may define an outwardly facing bearing surface 66 relative to the inner panel 12, with the bearing surface 66 facing the outer belt reinforcement 50. The bearing surface 66 may be configured to interact with and bear against the outer belt reinforcement 50, as further described below.

As shown in FIG. 4, the step portion 64 may further support the attachment of the window frame reinforcement 26 to the inner panel, and an open space may be defined between the window frame reinforcement 26 and the outer belt reinforcement 50. The window frame reinforcement 26 therefore may have a shape that corresponds to the shape of the inner panel 12, including the step portion 62.

In one aspect, shown in FIG. 4, the outer belt reinforcement 50 may include a touch-down member 68 extending inwardly from the outer belt reinforcement 50 toward the inner panel 12. The touch-down member 68 may also be referred to as a projection or leg. More particularly, the touch down member 68 may extend toward and abut the bearing surface 66 defined by the step portion 62 of the inner panel 12. In one aspect, the touch-down member 68 may define a hollow cavity with an opening that faces outwardly, and that is closed at its inner end, wherein the inner end abuts the bearing surface 66. The touch-down member 68, being hollow, may have a sidewall thickness that is generally consistent around its perimeter, and that is approximately the same as the remainder of the outer-belt reinforcement.

FIG. 4 further illustrates the touch-down member 68 contacting the bearing surface 66 at a location adjacent a lower edge of the window frame reinforcement 26. The touch down member 68 is furthermore disposed between the window frame reinforcement 26 and the latch reinforcement 28. The window frame reinforcement 26 and latch reinforcement 28 are disposed on the inner panel 12 in contact with the step portion 62. As shown in FIG. 4, the touch-down member makes direct contact with the inner door panel 12, as does the window frame reinforcement 26 and latch reinforcement 28. It will be appreciated that direct contact is intended to include arrangements where adhesive or the like may be disposed between adjacent panels/reinforcement members.

The outer belt reinforcement 50 may be disposed over the window frame reinforcement 26 in a stack-up direction, but may be spaced away from the window frame reinforcement 26, as shown in FIG. 4. A shown in FIG. 4, the outer belt reinforcement 50 may be disposed directly against the hem flange portion 60 of the inner door panel, in addition to the direct contact between the touch-down member 68 and the step portion 62. The hem flange portion 60 against which the outer belt reinforcement 50 is applied may be recessed or stepped down slightly, such that the rear edge of the inner panel 12 transitions into the outer belt reinforcement 50 when the outer belt reinforcement 50 is placed on the inner door panel 12. The combined thickness of the outer belt reinforcement 50 and the inner panel 12 at the location of the hem flange portion 60 may be greater than the adjacent thickness of the inner panel 12. Put another way, the thickness of the inner panel along its rear edge may be generally consistent, such that overlapping locations with other components have a greater overall thickness.

The system 10 may further include anti-flutter material 70 that may be applied to the outer-belt reinforcement member 50, as shown in FIG. 2. The anti-flutter material 70 may also be applied to the impact beam 40, as shown in FIG. 4. The anti-flutter material 70 may be disposed along other sections of panels or other sheets to reduce vibration as determined by modeling and other analysis. Both the impact beam 40 and the outer belt reinforcement member are generally spaced away from the inner panel 12, thereby spanning the interior cavity or space defined by the inner panel 12, and can therefore be more susceptible to vibration relative to the various reinforcement panels that are directly applied to a surface of the inner panel 12 and that match the shape and contour of the inner panel 12.

FIG. 2-4 illustrate the system 10 in a generally assembled state, with the outer panel 18 removed for clarity and to illustrate the mounting relationship of the inner panel 12 and the various reinforcements attached thereto. It will be appreciated that the inner panel 12 may have various support surfaces formed thereon, against which corresponding reinforcement panels may be placed. The inner panel 12 may be formed of a stamped metal material, such as a cold formed sheet metal material, or heat treated material. The inner panel 12 may also be formed of a layered composite material.

Similarly, the various reinforcements described herein may be formed of stamped sheet metal or composites. Aside from the impact beam 40 and outer belt reinforcement member 50, the reinforcement members described herein may generally have the same shape and contour as the inner panel 12 in the location where they are mounted.

In one aspect, the outer belt reinforcement 50 may be formed of a layup carbon fiber RTM material. The latch reinforcement 28 may be an aluminum stamping (AL5032H32). The window frame reinforcement 26 may be chopped fiber SMC material. The impact beam 40 may be 2.5 mm thick warm formed aluminum material (AL7075). The outer panel 18 may be a 1.0 mm thick warm formed magnesium. The check link reinforcement 30 and the lower hinge reinforcement 30, 32 may be aluminum extrusions (AL6062-T6). The above arrangement of materials provides one example of a beneficial assembly of components and materials. However, it will be appreciated that alternative materials may be used for each of these components depending on the particular needs of the vehicle and door. Various shapes and thicknesses may also be used.

The outer belt reinforcement 50 and the overlap joint created with the hem flange portion 60 of the inner panel 12 contributes to providing high upper frame stiffness to the side door structure of the system 10. Additionally, the touch-down member 68 provides additional high upper frame stiffness in the side door structure of the system 10. Both features contribute to providing upper frame stiffness. Additionally, both features may be used in structures of various materials, including metal, composites, and the like.

By including these features on a representative composite side door structure, higher than target stiffness values are achieved. Composite materials have a lower modulus than metal materials, which can increase the challenge of achieving upper frame stiffness targets, and higher than target values are still achieved. Therefore, these features can be applied to metal materials of higher modulus and will also result in high, above-target stiffness values resulting in optimum seal performance. Accordingly, with above target stiffness values for the vehicle door structure, the vehicle door can withstand greater seal loads and/or provide increased compression on the door seal, thereby reducing wind noise and the like that is common with softer seal material and reduced seal loads.

Additionally, the use of the inner door panel 12 with corresponding reinforcement members allows for a reduction in weight of the door, by making allowing for less material in areas where load or stiffness requirements are lower. The areas where increased loads occur can are built up and reinforced via the reinforcement members for undergoing typical loads, such as at the hinge or latch, or at the window opening. The impact beam 40 and outer belt reinforcement member 50 provide additional structural support for safety.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A door-panel structure system, the system including:
    an inner panel having a front portion, rear portion, upper portion, and lower portion;
    an outer panel sized and arranged to mate with the inner panel to define a door structure having a first stiffness and an interior cavity;
    an outer belt reinforcement member extending between the front portion and the rear portion of the inner panel, and vertically disposed between the upper portion and the lower portion, and laterally disposed between the outer panel and the inner panel;
    wherein the outer belt reinforcement member defines an overlap joint with a hem flange portion of the inner panel, wherein the hem flange portion is disposed on the rear portion of the inner panel;
    a touch-down member extending inwardly from the outer belt reinforcement member into contact with a bearing surface of the inner panel; and
    wherein the overlap joint and the contact with the bearing surface combine to define a second stiffness that is greater than the first stiffness.

2. The system of claim 1, wherein the hem flange portion of the inner panel is disposed at a rear edge of the inner panel, wherein the outer panel overlaps the overlap joint and wraps around the rear edge of the inner panel to define a hem flange.

3. The system of claim 1, wherein the touch-down member is integrally formed with the outer belt reinforcement member.

4. The system of claim 1, wherein the inner panel defines a step portion recessed relative to the hem flange portion, wherein the touch-down portion contacts a bearing surface of the step portion.

5. The system of claim 1, wherein the hem flange portion of the inner panel is stepped down relative to an adjacent section of the rear portion of the inner panel such that the outer belt reinforcement member and the adjacent section are generally continuous and define a common plane against which the outer panel is mounted.

6. The system of claim 1, further comprising at least one reinforcement member attached to the inner panel.

7. The system of claim 6, wherein the at least one reinforcement member includes a window frame reinforcement member.

8. The system of claim 7, wherein a lower portion of the window frame reinforcement member is disposed laterally between the inner panel and the outer belt reinforcement member.

9. The system of claim 8, wherein the lower portion of the window frame reinforcement member has a profile corresponding to an inner surface of the inner panel, and wherein the outer belt reinforcement member is spaced away from the window frame reinforcement member.

10. The system of claim 9, wherein the touch-down member and the window frame reinforcement member each directly contact the inner surface of the inner panel.

11. The system of claim 1, wherein the outer belt reinforcement member defines a through-opening at a rear portion thereof, the through opening extending through the outer belt reinforcement member in a transverse direction to a fore-and-aft direction thereof, wherein the touch-down member is disposed adjacent the through-opening and extends in the transverse direction.

12. The system of claim 1, further comprising an impact beam extending in a fore-and-aft direction within the interior cavity and fixed to the door structure, wherein the impact beam provides additional stiffness to the door structure.

13. A method of increasing a stiffness of a door-panel structure system, the method including:
    providing an inner panel with a front portion, rear portion, upper portion, and lower portion;
    attaching an outer belt reinforcement member to the inner panel, wherein the outer belt reinforcement member extends in a fore-and-aft direction of a door panel structure;
    creating an overlap joint between a rear end of the outer belt reinforcement member and a hem flange portion of the inner panel;
    bringing a touch-down member of the outer belt reinforcement member into contact with a bearing surface of the inner panel, wherein the bearing surface is stepped down relative to the overlap joint;
    attaching an outer panel to the inner panel, wherein the outer panel covers the outer belt reinforcement member and defines an interior cavity with the inner panel.

14. The method of claim 13, further comprising wrapping a rear edge of the outer panel around the overlap joint and defining a hem flange around the rear end of the outer belt reinforcement member and the hem flange portion of the inner panel.

15. The method of claim 13, further comprising attaching a window frame reinforcement member to the inner panel and attaching the outer belt reinforcement member to the inner panel over a lower portion of the window frame reinforcement member, wherein the outer belt reinforcement member is spaced away from lower portion of the window frame reinforcement member to define an open space laterally therebetween.

16. The method of claim 13, wherein the touch-down member contacts the bearing surface of the inner panel adjacent the rear portion of the inner panel.

17. The method of claim 16, wherein the outer belt reinforcement member includes a through opening extending through a rear portion thereof and adjacent the touch-down member, the through opening extending through the outer belt reinforcement in a transverse direction to a fore-and-aft direction, wherein the touch-down member extends in the transverse direction.

18. The method of claim 15, wherein the touch-down member contacts the bearing surface of the inner panel at a location below and adjacent the lower portion of the window frame reinforcement member, wherein the window frame reinforcement member contacts the bearing surface of the inner panel.

19. The system of claim 1, wherein the touch-down member is disposed at a rear end of the outer belt reinforcement and contacts the bearing surface of the inner panel at a location adjacent the rear portion of the inner panel.

20. The system of claim 10, wherein the touch-down member directly contacts the bearing surface of the inner panel at a location adjacent a lower edge of the window frame reinforcement.

* * * * *